United States Patent [19]
Allen

[11] Patent Number: 5,635,969
[45] Date of Patent: Jun. 3, 1997

[54] METHOD AND APPARATUS FOR THE APPLICATION OF MULTIPART INK-JET INK CHEMISTRY

[76] Inventor: Ross R. Allen, 408 Hainline Dr., Belmont, Calif. 94002

[21] Appl. No.: 499,236

[22] Filed: Jul. 7, 1995

Related U.S. Application Data

[63] Continuation of Ser. No. 159,889, Nov. 30, 1993, abandoned.

[51] Int. Cl.⁶ ............................................. B41J 2/21
[52] U.S. Cl. ........................... 347/96; 347/7; 347/19
[58] Field of Search ........................ 347/96, 97, 7, 347/19

[56] References Cited

U.S. PATENT DOCUMENTS

| | | | |
|---|---|---|---|
| 4,046,074 | 9/1977 | Hochberg | 347/96 |
| 4,382,262 | 5/1983 | Savit | 347/96 |
| 4,538,160 | 8/1985 | Uchiyama | 347/96 |
| 4,599,627 | 7/1986 | Vollert | 346/140 |
| 4,694,302 | 9/1987 | Hackleman et al. | 346/1.1 |

FOREIGN PATENT DOCUMENTS

| | | | |
|---|---|---|---|
| 0137313A1 | 6/1984 | European Pat. Off. | B41J 3/04 |
| 564252A2 | 3/1993 | European Pat. Off. | H04N 1/18 |

*Primary Examiner*—Valerie Lund

[57] ABSTRACT

A multi-color ink-jet printing system includes a printing element for applying a precisely metered quantity of a colorless precursor in a binary or ternary chemical reaction to a precisely defined printing location on a recording medium surface. The precursor conditions the medium surface prior to application of one or more colorants to the recording medium surface to prevent recording medium cockle and curl, and to reduce dry time, while conditioning the recording medium surface for uniform dot gain independent of media composition. The precursor also immobilizes the colorants on the recording medium surface to enable one-pass, multi-color printing, while eliminating color bleed.

19 Claims, 4 Drawing Sheets

METHOD AND APPARATUS FOR THE APPLICATION OF MULTIPART INK-JET INK CHEMISTRY

CROSS REFERENCE TO RELATED APPLICATION

This is a continuation of application Ser. No. 08/159,889 filed on Nov. 30, 1993, now abandoned.

BACKGROUND OF THE INVENTION

1. Technical Field

The present invention relates to ink jet printers. More particularly, the present invention relates to a method and apparatus for providing consistent, high quality, multi-color ink jet printing having variable print density on any of various media.

2. Description of the Prior Art

Since the introduction of ink jet printing technology, the accepted solutions to the problems of leathering, dot gain, recording medium cockle and curl, and color bleed with single-part inks have included optimizing the formulation to the extent possible, minimizing the rate at which ink is printed on the recording medium, and adding energy to the ink either before or after printing to accomplish a complete or partial phase change. Such phase change includes both liquid-solid and liquid-vapor transitions, as well as significant changes in solubility and viscosity. In both of the foregoing methods, the print quality ("PQ") dependence on medium surface characteristics remains the same because the desired ink phase change does not occur rapidly enough to prevent some colorant migration on the surface of the recording medium, usually paper or transparency film. Thus, printing characteristic and resulting print quality varies from medium to medium.

So called tiling algorithms have been used to minimize the amount of ink applied to the medium and thus avoid somewhat color-to-color bleed and paper cockle and curl. Such tiling algorithms control the amount of ink applied during printing to produce a depleted matrix on each pass of a scanning printhead. A solid area fill is thereby eventually built up only after several passes of the printhead. In this way, the medium is not saturated during any one printing pass, and the medium is allowed to dry partially during the interval between printing passes.

However, such tiling algorithms slow the printing process, resulting in a significant throughput penalty and cannot easily be applied to page-wide array printing, which is adapted to single-pass, multicolor printing. The throughput penalty of tiling schemes seriously degrades printer performance when the printer is used for color printing, where several printing passes must be made for each of several colors. Such performance degradation is especially pronounced when the throughput achieved for color printing is compared to the throughput achieved for black-only printing: usually a 3:1 or 4:1 time penalty is realized (color print time: black print time).

The addition of energy to the printing process by heating the recording medium immediately before and/or during printing increases the rate of evaporation of the ink vehicle from the medium surface, thereby accelerating the rate at which ink applied to the medium dries at the medium surface. When paper is used as the recording medium, this ink vehicle evaporation limits penetration of the ink into the paper fibers and also limits capillary action on the surface of the paper. These two effects reduce cockle and color bleed.

However, energy addition must be adapted to the type of recording medium (plain paper, special paper, and overhead transparency film) and to print density. Heaters generally require a fan to remove ink vapor, and these components together significantly increase the cost and complexity of desktop printers.

In another method involving the addition of heat to the printing process, a hot-melt (solid) ink is delivered to the recording medium in a liquid state. The ink freezes upon coming into contact with the recording medium surface, thereby immobilizing the colorant component of the ink on the surface of the recording medium. The addition of solid ink delivery systems and the associated thermal management required by such systems significantly increases the cost and complexity of the printer, as well as increasing the demands made on the materials used in fabricating the print head, which must typically operate at 150°–200° C.

In either case above, the use of excessive heating causes undesirable structural changes in the medium, for example dimensional changes, browning, and embrittlement due to water loss in paper media, or do to melting in polymer based media, such as transparency films. Additionally, if the ink vehicle is evaporated too rapidly, the various colorants used in the ink can precipitate on the medium surface, resulting in browning of the printed region and poor adhesion of the colorant to the medium surface.

Reactive chemistry provides another energy source for effecting ink phase change that may be used in color printing. This approach mitigates some of the foregoing problems by introducing anionic/cationic reactions among the several colorants applied to the recording medium. Thus, the energy source for phase change is provided in the form of chemical energy in a binary ink system where one of the two components of the system contains a colorant and the other a fixer. Such two-part ink system undergoes a chemical reaction on the surface of the recording medium.

Typically, a first component of the binary system is applied contemporaneously with, or a short interval before, a second component of the binary system. Both pre- and post- treatments have been considered in the art. When the two components are combined on the recording medium, a chemical reaction takes place that immobilizes the ink. The various means taught in the art for applying such multi-part inks have included wetted rollers and wipers on the unprinted media, spray heads and misting devices, and thermal ink jet printheads.

A number of methods have been proposed to immobilize the colorant in situ on the paper surface. Such known methods include metal ion chelating, anionic/cationic reactions, and polymeric reactions. See, for example U.S. Pat. No. 4,694,302, Hackleman et al, *Reactive Ink-Jet Printing*, which discloses a method for increasing the water fastness of an ink-jet ink by combining the ink with a reactive species, either present in the paper itself, or separately applied to the paper.

The use of multi-component inks in thermal ink jet printers has been the subject of only limited investigation by researchers. To the extent that such research has been pursued, it has been narrowly focused on solving the color bleed problem. Thus, multi-component inks have not been investigated, proposed, or adapted for use in ink jet printers to eliminate the coupled problems of wet and dry paper cockle, color bleed, slow dry time (i.e. the time that elapses after printing a region with any color before the printed region is sufficiently dry that it cannot be smeared), and allow media-independent high quality single-pass color printing. Nor have such inks been suggested as a viable alternative to the commonly accepted use of both multi-pass tiling algorithms and the application of thermal energy to the ink jet printing process.

SUMMARY OF THE INVENTION

The invention provides a method and apparatus for applying binary or ternary ink chemistry to print media, such as paper and overhead transparency film. The preferred embodiment of the invention solves the foregoing problems in a four-color ink-jet printing system according to the following process steps:

a. Conditioning the paper surface to prevent cockle and curl;
 b. Conditioning the paper surface to immobilize the colorant to enable one-pass, four-color printing;
 c. Conditioning the paper surface to immobilize the colorant to eliminate color bleed;
 d. Conditioning the paper surface for uniform dot gain independent of media; and
 e. Conditioning the paper surface to decrease drytime.

The invention exploits to advantage the ability of an ink jet printer to deliver a precisely metered quantity of a component in a binary or ternary chemical reaction to a precisely defined location on the surface of a recording medium. Because the quantity of such component applied to the recording medium surface is precisely controlled, the size of the resulting conditioned area on the recording medium surface is precisely controlled. Chemicals are delivered only to those areas where they are used, thus making efficient use of consumables. In this way, the invention provides a method and apparatus for applying two-and three-part ink chemistries to a recording medium using an ink jet printer.

In the preferred embodiment of the invention, the medium is conditioned as set forth above by adding a fifth printhead to a four-color printer. The fifth printhead applies a colorless liquid to the recording medium as a component of a binary or ternary ink chemistry. Typically, binary chemistry involves the component in the "fifth printhead" with one primary color, usually cyan, magenta, yellow, or black. Ternary chemistry typically involves printing two primary colors to form secondary colors (red, green, blue) along with the component in the "fifth printhead".

Application of this colorless ink component to the recording medium surface conditions the medium prior to application of colorants to the medium surface, and thus defines a print location on the recording medium surface at which the colorant is fixed upon application, and within the boundaries of which the colorant is maintained. As a result, the colorant is immediately immobilized on the recording medium surface, thereby avoiding color bleed; and the colorant is constrained within the recording medium surface location defined by the colorless ink component, thus allowing reliable, high quality one-pass, multi-color printing on any desired recording medium. Because the two- or three-part ink chemistry used in the present invention has the objective of controlling cockle and drytime by chemical means, heaters and fans may be eliminated.

DETAILED DESCRIPTION OF THE INVENTION

The invention herein may be practiced in connection with any known binary or ternary ink chemistry, such as the ink disclosed by D. Hackleman, N. Pawlowski, *Reactive Ink-Jet Printing*, U.S. Pat. No. 4,694,302 (Sep. 15, 1987), which document is hereby incorporated herein by this reference thereto.

The invention provides a method and apparatus for applying a precisely metered and placed component of a binary or ternary ink chemistry, referred to as the precursor (or part "A") component, to a recording medium, such as paper or overhead transparency film. The precursor component serves to condition the recording medium surface to prevent cockle and curl. The precursor component also provides a component of a chemical reaction that prepares the recording medium surface to immediately immobilize colorants when applied to the recording medium surface and thus enable one-pass, four-color printing. Additionally, application of the precursor to the recording medium surface conditions the medium surface to immobilize colorants applied thereto and thereby eliminates color bleed, while allowing uniform dot gain independent of media, and while reducing drytime, thereby increasing printing speed. The invention provides the foregoing advantages while minimizing the consumption of the precursor component, while minimizing the hardware and firmware burden of applying the precursor component to the recording medium surface.

Figure 1:
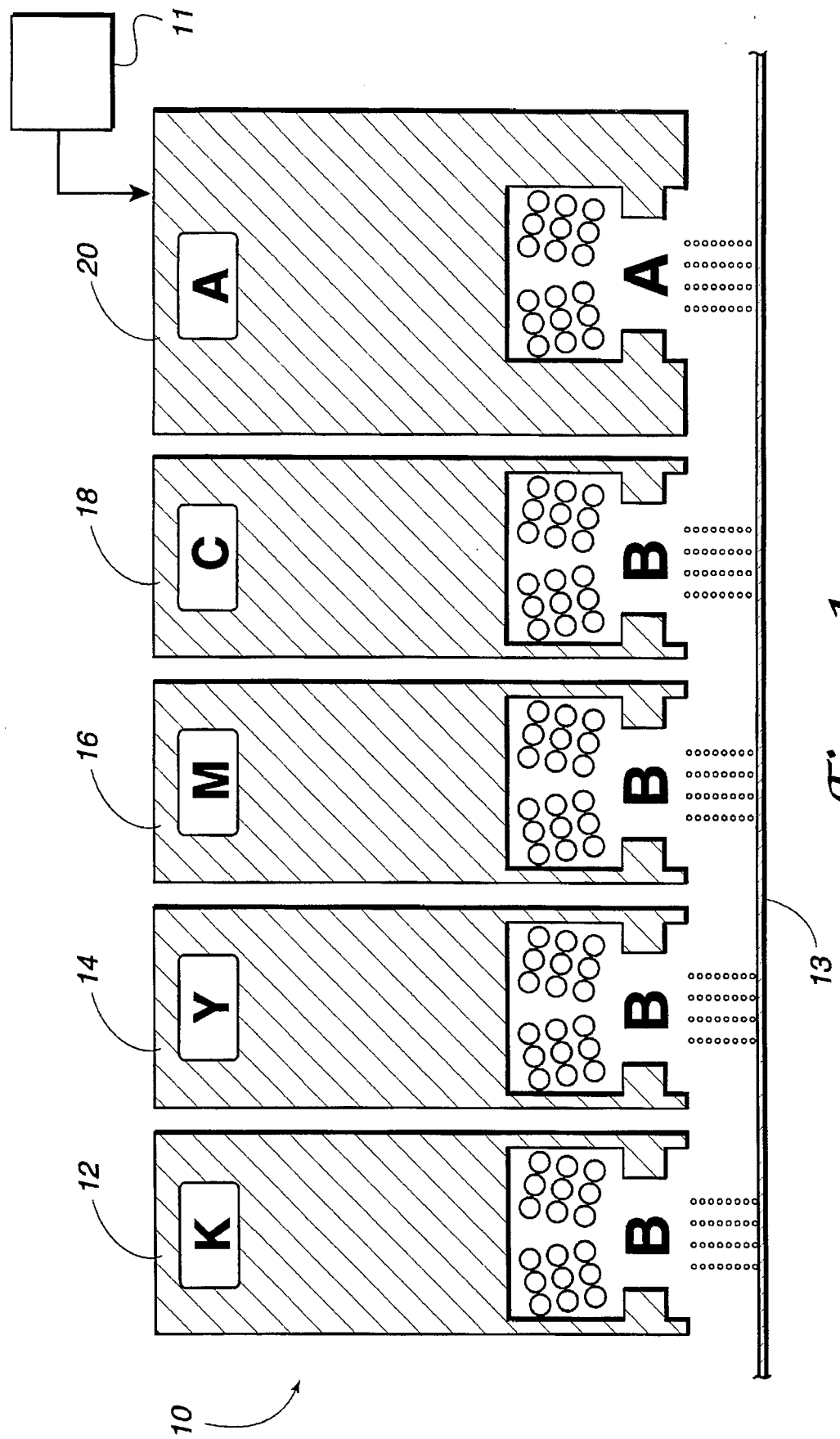
FIG. 1 is a partial schematic side view of a thermal ink jet printer employing cartridges or printheads providing cyan, magenta, yellow, and black colorants, and also employing a precursor component cartridge or printhead according to the present invention.

FIG. 1 is a partial schematic side view of a thermal ink jet printer 10 employing cartridges or printheads 12,14,16,18 that provide cyan (C), magenta (M), yellow (Y), and black (K) colorants, and employing a precursor (A) cartridge or printhead 20. In the preferred embodiment of the invention, the part "A" cartridge 20 is operated to apply a colorless component of a binary ink to a recording medium 13 at each pixel location where a subsequent CMY or K drop is placed. This embodiment of the invention is provided for printers having either a scanning printhead or pagewide arrays of printheads since an objective of the ink system is to provide single-pass CMYK printing (without multipass tiling). In embodiments of the invention in which a scanning carriage printer is used, it may be necessary to have two part "A" applicators, one at each side of a print carriage assembly, to enable bi-directional black printing should the black printer require the part "A" component to achieve bleed, drytime, and media independence objectives. It will be recognized by those skilled in the art that the present invention may be applied to printers having more or fewer printheads.

In the invention, the part "A" component or precursor serves to condition the recording medium and thereby prevent color bleed, while producing media-independent spot size without introducing cockle. Because ink jet printers are well known for their ability to place precisely metered quantities of inks at precisely determined locations on a recording medium it is expected that known ink jet printers may be readily adapted to operate in accordance with the teachings herein. In practicing the invention, it is important to use a printhead that places a quantity of the part "A" component on the recording medium surface that is appropriate for the binary or ternary ink chemistry selected. Such choice is within the skill in the art in view of the fact that printhead droplet volumes are readily controlled as desired.

An important consideration in practicing the invention is the time required for the part "A" component to interact with the recording medium through surface absorption and penetration. This reaction time may require a spacing or separation in time between the application of the part "A" component to the recording medium surface and the application of the first colored droplet to the recording medium (or vice versa if the colorant is to be applied first, as may be the case in some applications of the invention). In a page-wide device, this time separation or spacing is provided by physically separating the printhead providing the part "A" component from the first colored printhead, thereby increasing the time it takes for a point on the moving recording medium to pass under both printheads.

In a scanning arrangement, where carriage width strongly drives product form factor, the part "A" component printer may be placed and operated to print on a separate, previous swath from that of the CMYK printers. This is desirable both to reduce product width and, potentially, to allow the part "A" material to spread on the recording medium and react with it before the addition of colored inks. Thus, one feature of the invention involves placing the part "A" or precursor printer in an arrangement relative to the color and/or black printers that minimizes the width of the printer.

EXAMPLE

Timing considerations for printing of the part "A" component on a recording medium surface to condition the recording medium, relative to the placement of a colorant drop, are typically as follows:

The time between depositing drops of ink for adjacent printers of different colors is determined according to the formula:

$$t = x/v \quad (1)$$

where:

t=the time between successive ink drops=1/frequency (Hz);

x=space between drop generators in inches (or centimeters) in different printheads recording onto the same pixel for out-on-out printing; and v=print carriage slew speed (inches or cm/second).

Print carriage slew speed in inches/second is determined as follows:

$$v = f/r \quad (2)$$

where:

f=droplet ejection (or pixel printing) rate; and r=printing resolution, expressed in dots/inch.

Applying the above formulae, where the space between printheads is one-inch and the slew speed is 20-inches/second (i.e. printing frequency of 6 kHz/300 dots per inch resolution), the typical time between application of drops of ink is 50 ms. That is, printing dot on dot typically occurs with a minimum delay of 50 ms. Thus, placing the part "A" printhead one-inch from the next adjacent print head requires the use of an ink chemistry in which the part "A" component is applied to the recording medium and the recording medium surface is conditioned and ready to receive colorant 50 ms after the part "A" component is applied. Spacing the part "A" printhead two inches from the next adjacent printhead allows 100 ms for recording medium conditioning, etc. in accordance with the above example. From the foregoing it can be seen that choice of ink chemistry and printer width/printhead placement are interrelated. Thus, in practicing the invention, an ink chemistry should be chosen in which recording medium conditioning time is minimized to accordingly minimize spacing between the part "A" component printhead and the colorant printheads.

The presence of the fifth printhead adds complexity to product mechanics and electronics. For example, the scanning carriage may be either wider or deeper depending on how the fifth printhead is arranged. Also, in some embodiments of the invention the arrangement of the service station may be complicated by the need to avoid contact and mixing between the colorants CMYK and the precursor "A" on the nozzle plate or service station components. Additional power supply, drive electronics, swath RAM, processor burden, and interconnect may also required.

The rate of consumption of the part "A" component depends upon the total use of all other ink colors. In the preferred embodiment of the invention, the supply of the part "A" component is exhausted asynchronously with any color. Depending on quantity of the ejected droplet, the part "A" component may have the highest rate of consumption or be approximately matched to one color, preferably that color that is most used, i.e. black.

In some embodiments of the invention, it is desirable to provide a sensor 11 that detects either the exhaustion of the precursor or when only a small quantity of the precursor remains and that, in response thereto, switches the printer into a conventional multipass, tiling mode to minimize color bleed. It is likely that switching to a conventional print mode may degrade both color bleed and cockle performance of the printer, but doing so will allow the user to continue printing. Thus, this embodiment is considered an optional implementation of the invention. In applications where degraded print quality is not acceptable, it is desirable to terminate printer operation upon detection of precursor depletion or imminent precursor depletion.

Figure 2:
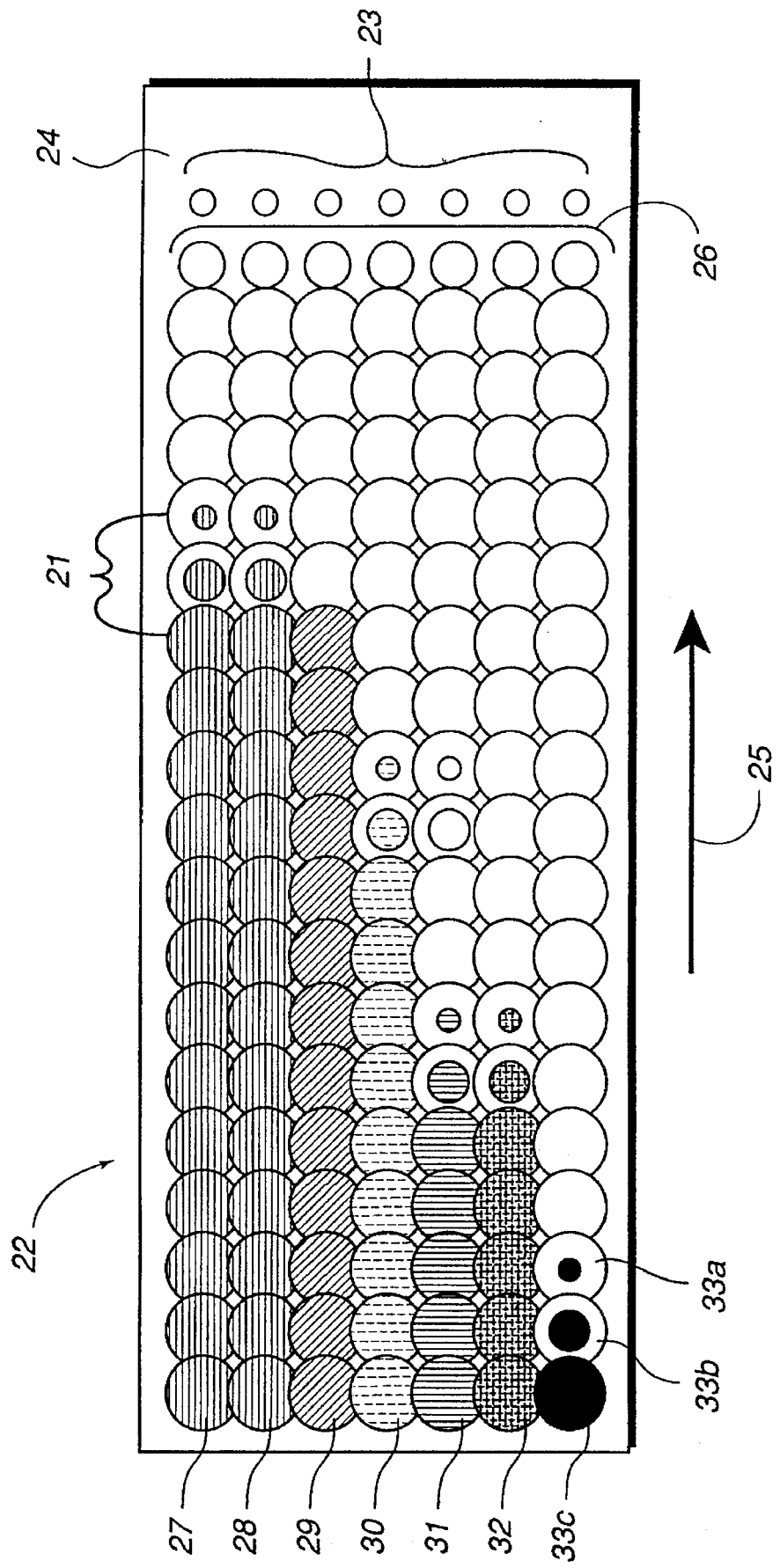
FIG. 2 is a plan view of a recording medium to which a spot of a precursor component has been printed at each location that is to receive a colorant or ink spot according to the present invention.

FIG. 2 is a plan view of a recording medium 22 having a surface 24, including seven pixel locations 23 which correspond to seven potential print locations for an N * 7 print head. The direction of paper travel during printing is indicated in the figure by an arrow 25. The figure shows those locations to which a part "A" spot 26 has been printed, and which correspond to each location that is to receive a colorant or ink spot. That is, the part "A" component is shown printed everywhere a black or colored spot is to appear. The sequence of increasing spot diameters, e.g. as indicated by numeric designator 21, is provided to represent schematically the spread of part "A" on paper for a fraction of a second after deposition.

The various colors that may be printed with the CMYK printer of the invention are shown in FIG. 2 on the surface of the recording medium 22 and include cyan 27, blue 28, green 29, magenta 30, red 1, yellow 32, and black 33a–33c. For example, a drop of black ink 33a is applied to a conditioned location on the paper surface. As the ink spreads within the conditioned location, as indicated in the figure by numeric designator 33b, the ink reacts with the colorless part "A" component in a complementary reaction that immobilizes the ink on the recording medium surface and within the area bounded by the location to which the part "A" component has been applied, as shown in the figure by numeric designator 33c. Thus, the printer of the invention prints a pixel of colorless liquid at each print location to define in a precise fashion a uniform print dot. Colorant subsequently printed at such conditioned location is both carried across the predefined dot to provide uniform dot gain and is confined within the conditioned area to prevent feathering. Bleeding is avoided because the reaction between the precursor part "A" component and the colorant immobilizes the colorant within the conditioned region. That is, although the ink drop spreads slightly upon application to the surface of the paper due to kinematic effects of drop splashdown, the ink drop does not significantly diffuse across the paper surface. Various ink chemistries that may be used in connection with the invention are known. See, for example U.S. Pat. No. 4,694,302, Hackleman et al, *Reactive Ink-Jet Printing*.

In some embodiments of the invention, the part "A" component may be printed at the resolution of the CMYK printer or at la fraction of the printing resolution. That is, where one part "A" component drop produces a conditioned location that spans $N^2$ * CMYK pixels, and where N=1, 2, 3, . . . . . In this case, the part "A" printer is activated if any CMYK spot is printed within the N×N area. This reduces the number of part "A" printers (orifices), with a corresponding reduction in the complexity of drive electronics. Both of these reductions contribute to lowering the cost of printer implementation. However, part "A" may be printed where some of the CMYK pixels are empty within the boundary of the part "A" spot.

The following section discusses the implications of various print resolutions for part "A" component application.

CMYK Resolution

The five-printhead printer scans the swath buffer performing a logical OR on all data to produce a swath bit-map in which a part "A" drop is printed everywhere a CMYK drop is to be placed. In the preferred embodiment of the invention, the OR function is accomplished in firmware as the CMYK swath buffer is filled.

Figure 3:
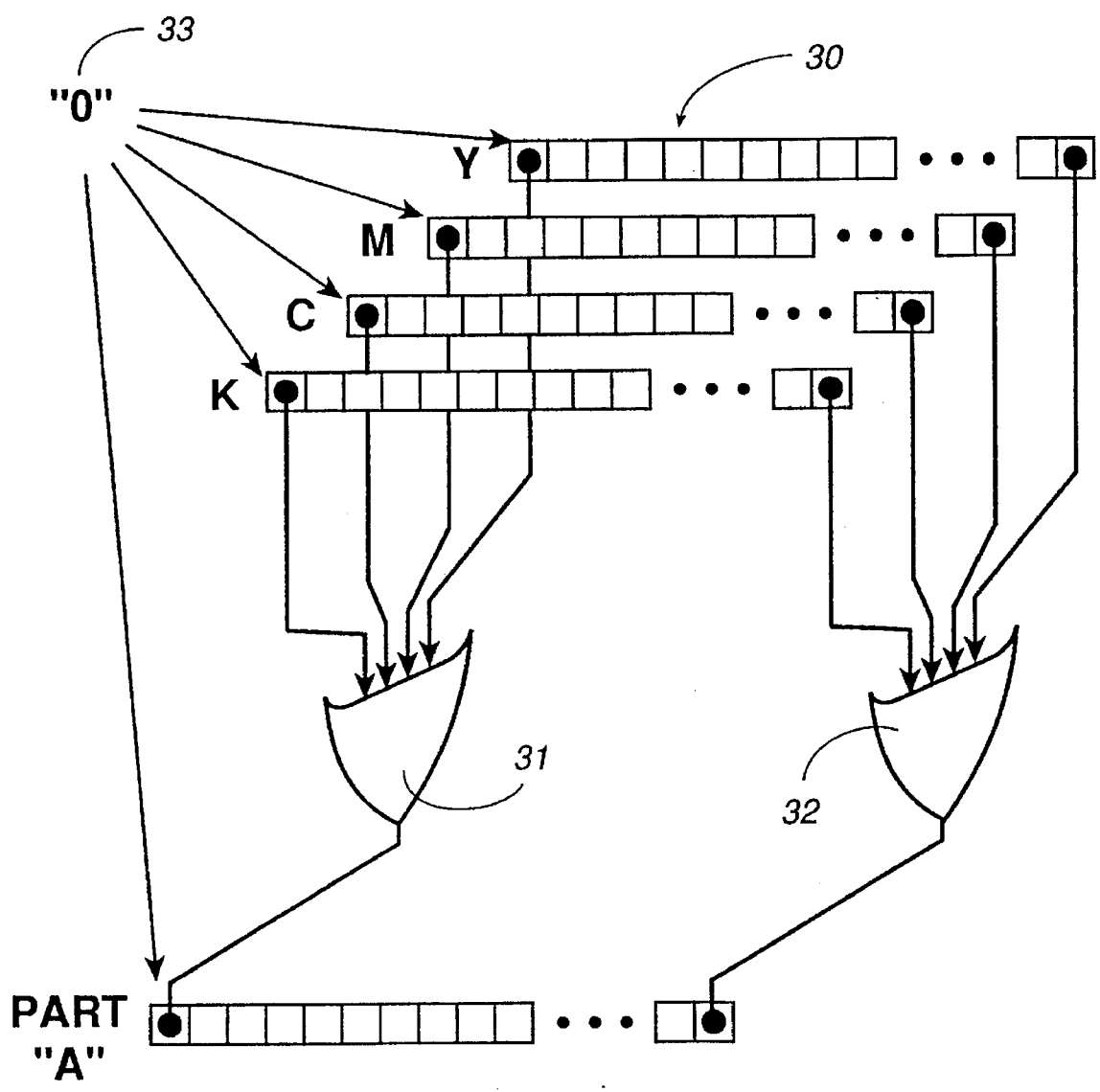
FIG. 3 is a simplified schematic showing an example of printing part "A" in any pixel with part "B" according to one embodiment of the present invention.

See, for example FIG. 3 which is a simplified schematic showing an example of printing part "A" in any pixel with part "B". In the figure, a swath buffer is provided for each color (Y, M, C, B) and for part "A" (identified collectively in the figure by numeric designator 30). In the example shown in the figure, a spot that is to be printed at pixel position "0" (33) for each of the colored printers (Y, M, C, and B) is output from each swath buffer to OR gates 31,32, thereby actuating the part "A" printer to print a dot of part "A" component at that location.

For printers printing A+CMYK on the same physical swath, a single buffer is used with hardware OR of the CMYK data. In this scheme, the part "A" component printer has the same number of nozzles as the largest of the CMYK printheads to enable single-swath conditioning of the recording medium. This increases the number of drivers and interconnect by approximately 25% over that of a printhead system.

For alternate embodiments of the invention employing a scanning carriage where the part "A" component is applied to a previous swath, at least two swath buffers are required: one for the advanced part "A"-swath containing data for the subsequent CMYK-swath, one for the current CMYK-swath. Data can be stored in alternate buffers on alternate swaths, where one buffer is filled as the other buffer is being read.

Low-Resolution A+High-Resolution CMYK

This embodiment of the invention reduces the number of nozzles on the part "A" printer and thereby reduces the number of drivers and the complexity of the interconnect. The swath width of the part "A" component printer is still the same as the largest of CMYK component printers. Swath RAM requirements are not necessarily reduced in this embodiment of the invention because the CMYK swath must be preprocessed to determine if any CMYK drop is printed within the boundary of the larger part "A" component pixel.

Figure 4A:
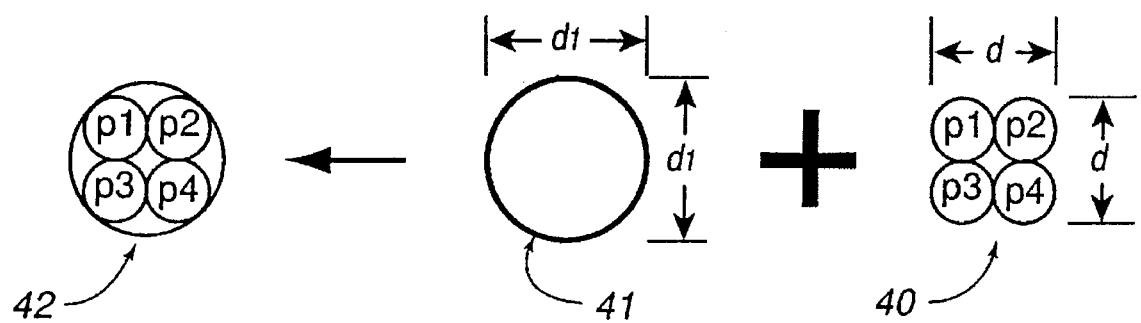
FIGS. 4a and 4b provide a simplified schematic showing an example of printing part "A" at one-half resolution of part "B" according to another embodiment of the present invention.
Figure 4B:
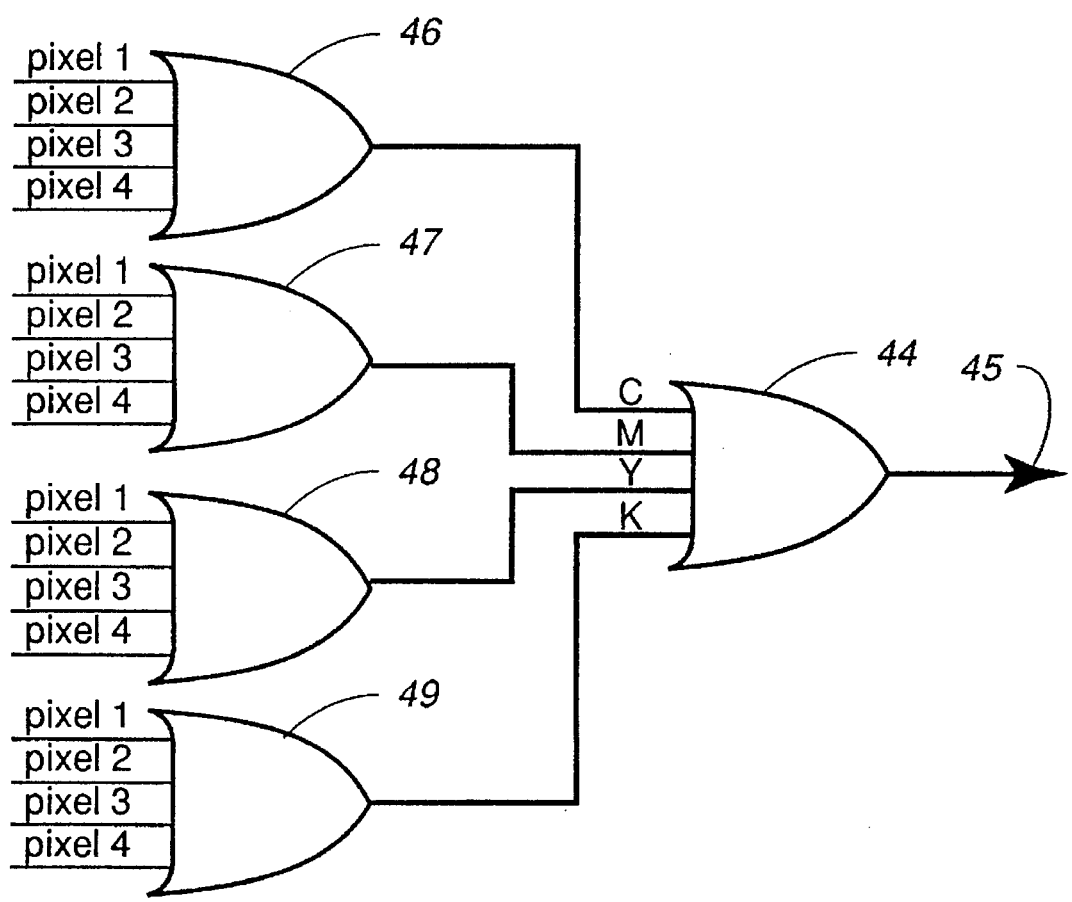

See, for example FIGS. 4a and 4b which provide a simplified schematic showing an example of printing part "A" at one-half resolution of part "B". In FIG. 4a, a group of part "B" pixels are shown having a resolution of N dots/inch (d), and which are identified as pixel 1, pixel 2, pixel 3, and pixel 4 (40). If any part "B" pixel in the group shown in the figure (40) is to be printed, then part "A" is also printed (41), preferably having a resolution ($d_1$) large enough to cover each pixel location that may be printed as pixel 1 (p1), pixel 2 (p2), pixel 3 (p3), and/or pixel 4 (p4). This results in the part "A" pixel being printed at N/2 dots/inch (42). That is, if any pixel of the 2×2 pixel group 40 is to be printed, then a part "A" component having a resolution of the same size as the 2×2 group is printed 41, thereby recording the desired pixels on the recording medium 42. Accordingly, in this embodiment of the invention, a single part "A" component dot is printed for from one to four adjacent part "B" pixels.

FIG. 4b shows a logic implementation of this embodiment of the invention in which a "TRUE" input for each of pixels 1, 2, 3, and 4 to be printed is provided to an OR gate 46,47,48, and 49 for each colored printer C, M, Y, and B for a group of part "B" pixels (pixel 1, pixel 2, pixel 3, and pixel 4, described above in connection with FIG. 4a). The "TRUE" output of each OR gate (46,47,48, and 49) is input to an OR gate 44 which, in turn, provides an output 45 that actuates the part "A" printer and prints a part "A" dot on the recording medium when its output is "TRUE". In this way, the part "A" component is printed for any occurrence of part "B" pixels in a 2×2 matrix. The representation of an "OR" gate in FIG. 4b is provided for symbolic purposes. The invention may be implemented in hardware, firmware, software, or by any other technique.

Although the invention is described herein with reference to the preferred embodiment, one skilled in the art will readily appreciate that other applications may be substituted for those set forth herein without departing from the spirit and scope of the present invention. For example, a precursor or part "A" component reservoir may be physically packaged with the reservoir for black ink, so that the precursor component is automatically replaced with a black printhead or black ink cartridge. This frees the user from managing additional individual consumables. Since black is usually consumed most rapidly, linking replacement of the part "A" component to that of the black ink may provide a close approximation of actual depletion rates for most users, and thus offers a convenient consumable management scheme which reduces the number of consumables the consumer need to stock, thereby minimizing consumer confusion.

Accordingly, the invention should only be limited by the Claims included below.

I claim:

1. In an ink jet printer, a method for applying ink to a plurality of pixel locations on a recording medium, comprising the steps of:

applying a precisely metered, precisely-positioned ink precursor to said recording medium from at least one precursor printhead to condition the recording medium at each pixel location on said medium;

applying at least one ink to each conditioned pixel location on said recording medium from at least one ink printhead;

detecting how much of said precursor is available for conditioning the recording medium; and switching said printer into a multipass printing mode when an insufficient quantity of said precursor remains to condition said recording medium surface;

wherein the quantity of said ink precursor applied is minimized because the quantity of said ink precursor applied to said recording medium is precisely controlled and the size of said resulting conditioned area on said recording medium is precisely controlled, such that said ink precursor is delivered only to those areas of said recording medium where they are used;

wherein the precursor immobilizes the ink on the recording medium surface within an area bounded by the pixel location to which the precursor has been applied.

2. In a multi-color ink jet printer having a separate ink printhead for applying each of a multiple of color inks, a method for applying binary or ternary ink jet ink chemistry to a plurality of pixel locations on a recording medium surface, comprising the steps of:

applying a colorless precursor to said recording medium surface at each pixel location on said recording medium surface using at least one separate ink printhead to condition the recording medium surface at each pixel location prior to application of colored ink to said pixel location;

applying a colored ink to each of said conditioned pixel locations;

detecting how much of said precursor is available for conditioning the recording medium; and switching said printer into a multipass printing mode when an insufficient quantity of said precursor remains to condition said recording medium surface;

wherein the quantity of said ink precursor applied is minimized because the quantity of said ink precursor applied to said recording medium is precisely controlled and the size of said resulting conditioned area on said recording medium is precisely controlled, such that said ink precursor is delivered only to those areas of said recording medium where they are used;

wherein said precursor and said colored ink react, thereby confining the ink to the pixel location defined by said precursor and thereby immediately immobilizing said colored ink at said pixel location.

3. The method of claim 2, wherein said precursor and said colored ink are each stored in separate, physically joined reservoirs.

4. The method of claim 2, wherein said precursor and said colored ink are applied in a single pass.

5. The method of claim 2, wherein said precursor conditions said recording medium to prevent wet and dry cockle.

6. The method of claim 2, wherein said precursor conditions said recording medium surface to enhance drytime of images recorded thereon.

7. The method of claim 2, further comprising the steps of:

performing at each pixel location a logical-OR on all data in a printer swath memory for each color of said multiple of color inks to determine which colored ink of said multiple of color inks is printed on said recording medium surface at said pixel location; and applying said precursor to each recording medium surface location at which a pixel of said colored ink is to be printed.

8. The method of claim 2, further comprising the steps of:

determining when more than one colored ink pixel is applied as part of a pixel group; and applying said precursor to recording medium surface to condition said recording medium surface for each of said more than one colored pixels to be recorded as part of said pixel group.

9. The method of claim 2, further comprising the steps of:

applying said precursor with two separate precursor printheads during bidirectional printing.

10. In an ink jet printer, an apparatus for applying ink to a plurality of pixel locations on a recording medium having a recording medium surface, comprising:

at least one precursor printhead for applying a precisely metered, precisely-positioned ink precursor to said recording medium to condition the recording medium at each pixel location on said medium;

at least one ink printhead for applying at least one ink to each conditioned pixel location on said recording medium;

a sensor coupled to said at least one precursor printhead and adapted to detect how much of said precursor is available for conditioning the recording medium, said sensor coupled to switch said printer into a multipass printing mode when said sensor detects that an insufficient quantity of said precursor remains to condition said recording medium surface;

wherein the precursor immobilizes the ink on the recording medium surface within an area bounded by the pixel location to which the precursor has been applied.

11. In a multi-color ink jet printer having a separate printhead for applying each ink color, an apparatus for applying binary or ternary ink jet chemistry to a plurality of pixel locations on a recording medium surface, comprising:

a first printhead for applying a colorless precursor to said recording medium surface at each pixel location on said recording medium surface to condition the recording medium surface prior to application of colored ink to said pixel location;

at least a second printhead for applying a colored ink to each conditioned pixel location;

a precursor reservoir coupled to said first printhead and adapted to supply ink thereto; and a sensor coupled to said first printhead and adapted to sense how much of said precursor is available in said precursor reservoir for conditioning said recording medium; said sensor coupled to switch said printer into a multipass printing mode when said sensor senses that there is not enough of said precursor in said precursor reservoir to condition said recording medium;

wherein the quantity of said ink precursor applied is minimized because the quantity of said ink precursor applied to said recording medium is precisely controlled and the size of said resulting conditioned area on said recording medium is precisely controlled, such that said ink precursor is delivered only to those areas of said recording medium where they are used;

wherein said precursor and said colored ink react, thereby confining the ink to the pixel location defined by said precursor and thereby immediately immobilizing said colored ink at said pixel location.

12. The apparatus of claim 11, further comprising:

a precursor reservoir coupled to said first printhead for supplying ink thereto; and a colored ink reservoir coupled to said second printhead for supplying ink thereto;

wherein said precursor reservoir and said colored ink reservoir are separate, physically joined reservoirs.

13. The apparatus of claim 11, wherein said precursor and said colored ink are applied in a single pass.

14. The apparatus of claim 11, wherein said first printhead applies said precursor to said recording medium surface at each pixel location; and wherein said precursor conditions each pixel location to print a spot having a constant, media-independent size.

15. The apparatus of claim 11, wherein said first printhead applies said precursor to said recording medium surface; and wherein said precursor conditions said recording medium to prevent cockle.

16. The apparatus of claim 11, wherein said first printhead applies said precursor to said recording medium surface; and wherein said precursor conditions said recording medium surface to enhance drytime of images recorded therein.

17. The apparatus of claim 11, further comprising:

a printer swath memory for storing print data corresponding to pixel locations;

a logic element coupled to said printer swath memory for performing at each pixel location a logical-OR on all data stored in said printer swath memory for each color of said multi-color inks to determine those locations on said recording medium surface at which pixels are printed; and means coupled to said logic element for operating said first printhead to apply said precursor to each recording medium surface location at which a pixel is to be printed.

18. The apparatus of claim 11, further comprising:

means for determining when more than one colored ink pixel is applied to said recording medium surface as part of a pixel group within the boundary of a location to which said precursor is applied; and means coupled to said means for determining and responsive thereto for operating said first printhead to apply said precursor to said recording medium surface for each of said more than one colored pixels recorded as part of said pixel group.

19. The apparatus of claim 11, said first printhead further comprising:

first and second precursor printheads for applying said precursor during bidirectional printing.

* * * * *